US009022341B2

(12) United States Patent
Radmard

(10) Patent No.: US 9,022,341 B2
(45) Date of Patent: May 5, 2015

(54) APPARATUS TO SUPPORT PORTABLE ELECTRONIC DEVICES AND OTHER DEVICES OR OBJECTS

(71) Applicant: Rambod Radmard, Dollard des Ormeaux (CA)

(72) Inventor: Rambod Radmard, Dollard des Ormeaux (CA)

( * ) Notice: Subject to any disclaimer, the term of this patent is extended or adjusted under 35 U.S.C. 154(b) by 74 days.

(21) Appl. No.: 13/804,233

(22) Filed: Mar. 14, 2013

(65) Prior Publication Data

US 2013/0256497 A1 Oct. 3, 2013

Related U.S. Application Data

(60) Provisional application No. 61/617,568, filed on Mar. 29, 2012.

(51) Int. Cl.

| | |
|---|---|
| ***F16M 13/00*** | (2006.01) |
| ***A47G 1/24*** | (2006.01) |
| ***F16M 11/00*** | (2006.01) |
| ***F16M 11/10*** | (2006.01) |
| ***F16M 11/38*** | (2006.01) |
| *A47B 23/04* | (2006.01) |
| *A47F 5/10* | (2006.01) |

(52) U.S. Cl.

CPC ................ *F16M 11/00* (2013.01); *A47B 23/04* (2013.01); *A47F 5/10* (2013.01); *F16M 11/10* (2013.01); *F16M 11/38* (2013.01); *F16M 13/00* (2013.01); *Y10S 248/917* (2013.01); *Y10S 248/918* (2013.01); *Y10S 248/922* (2013.01); *Y10S 248/923* (2013.01)

(58) Field of Classification Search

CPC .... A47B 23/04; A47B 23/042; A47B 23/043; A47B 23/044; A47B 23/049; A47B 97/08; A47B 97/04; A47F 5/10; A47F 5/108; A47F 5/11; A47F 5/12; A47G 1/141; F16M 11/38

USPC .............. 248/91–918, 922–923; 211/43, 189, 211/195; 40/124.16, 661.08, 754, 755, 780, 40/786; 206/45.24

See application file for complete search history.

(56) References Cited

U.S. PATENT DOCUMENTS

| | | | | |
|---|---|---|---|---|
| 5,607,135 A * | 3/1997 | Yamada | ........................ | 248/456 |
| 5,973,244 A * | 10/1999 | McCulloch | ..................... | 84/327 |

(Continued)

FOREIGN PATENT DOCUMENTS

| | | | |
|---|---|---|---|
| EP | 2378743 | A1 | 10/2011 |
| WO | 2011106223 | A1 | 9/2011 |

OTHER PUBLICATIONS

International Search Report and the Written Opinion of the International Searching Authority mailed Jul. 18, 2013 for International Application No. PCT/US2013/033804.

(Continued)

*Primary Examiner* — Christopher Garft

(57) ABSTRACT

An apparatus to support a device includes a first base; a first support; a first base-support hinge adapted to rotatably couple the first base and the first support along a first axis of rotation; a first swivel slidably connected to the first support and having a first cut-out adapted to receive a first portion of the device; a second base; a second support; a second base-support hinge adapted to rotatably couple the second base and the second support along a second axis of rotation; and a second swivel slidably connected to the second support and having a second cut-out adapted to receive a second portion of the device spaced apart from the first portion of the device.

18 Claims, 14 Drawing Sheets

(56) References Cited

U.S. PATENT DOCUMENTS

| | | | | |
|---|---|---|---|---|
| 7,417,853 | B1 * | 8/2008 | Myers et al. | 361/679.55 |
| 7,527,235 | B2 * | 5/2009 | Hummel | 248/459 |
| 7,861,995 | B2 * | 1/2011 | Liou | 248/454 |
| 8,100,376 | B2 * | 1/2012 | Ye | 248/454 |
| 8,146,870 | B1 * | 4/2012 | Cooper | 248/166 |
| 8,708,301 | B2 * | 4/2014 | Grammer et al. | 248/460 |
| 8,727,295 | B2 * | 5/2014 | Peng | 248/346.06 |
| 2003/0103328 | A1 | 6/2003 | Hillis et al. | |
| 2010/0090085 | A1 * | 4/2010 | Corrion | 248/459 |
| 2010/0213331 | A1 * | 8/2010 | Liou | 248/176.3 |
| 2011/0101193 | A1 * | 5/2011 | Ye | 248/397 |
| 2011/0253850 | A1 | 10/2011 | Bau | |
| 2011/0278421 | A1 * | 11/2011 | Guldalian | 248/459 |
| 2012/0074271 | A1 | 3/2012 | Goetz | |
| 2012/0074284 | A1 | 3/2012 | Huang | |
| 2012/0318950 | A1 * | 12/2012 | Wilber | 248/459 |
| 2013/0026112 | A1 * | 1/2013 | Ting | 211/26 |
| 2013/0026329 | A1 * | 1/2013 | Lane et al. | 248/459 |
| 2014/0143958 | A1 * | 5/2014 | Barr | 7/138 |

OTHER PUBLICATIONS

InfiniteLoop, "The Infinite Loop Tablet and Smartphone Stand," launched Jun. 22, 2011, www.kickstarter.com/projects/1851768099/the-infinite-loop-tablet-and-smartphone-stand.

Clint Slone, Mike & Eric Strasser, "The tiltpod—world's smallest articulating iPhone stand," launched Mar. 1, 2012, www.kickstarter.com/projects/1135391070/the-tiltpod-worlds-smallest-articulating-iphone-ba.

Dan Provost & Tom Gerhardt, "Glif—iPhone 4 Tripod Mount & Stand," launched Oct. 3, 2010, www.kickstarter.com/projects/danprovost/glif-iphone-4-tripod-mount-and-stand.

Brian Weinberg, "IKliK: a multi-angle minimalistic stand for your iPhone," launched Dec. 21, 2011, www.kickstarter.com/projects/1641405549/iklik-a-multi-angle-minimalistic-stand-for-your-to.

JR Sanchez, "MobileMount—Double Suction Cup Mount for Phones/Tablets," launched Sep. 30, 2011, www.kickstarter.com/projects/674303746/mobilemountsuction-cup-mount-and-kickstand-for-pho.

Tevami, "Dakko'The Most Compact and Eco-Friendly iPhone Stand Ever," Jan. 12, 2012, http://tevami.com/2012/01/12/dakko-the-most-compact-and-eco-friendly-iphone-stand-ever/.

PR Web, Seskimo Launches the Batrest, the Only Portable iPhone 3G Video Stand the Size of a Credit Card, Sep. 1, 2008.

iFoldAway, "The portable, lightweight movie viewing stand," 2010, www.ifoldaway.com/.

StandEast, "A Smart Stand for your Smartphone," 2009-2011, www.standeazy.com/home.aspx.

* cited by examiner

Fig.1
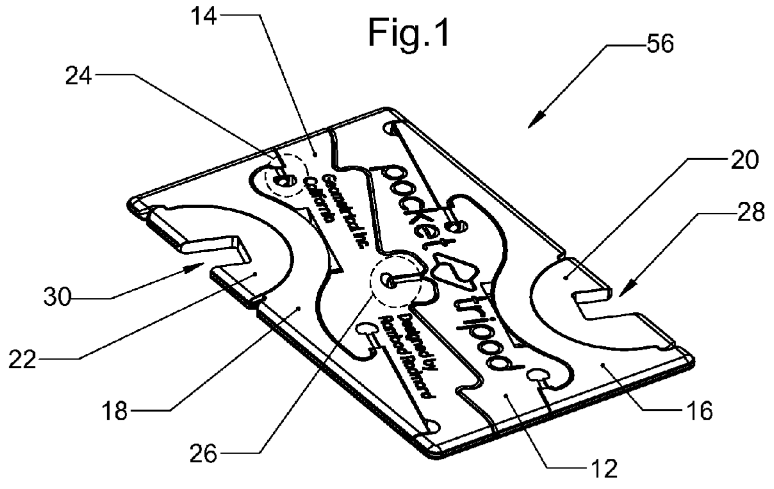
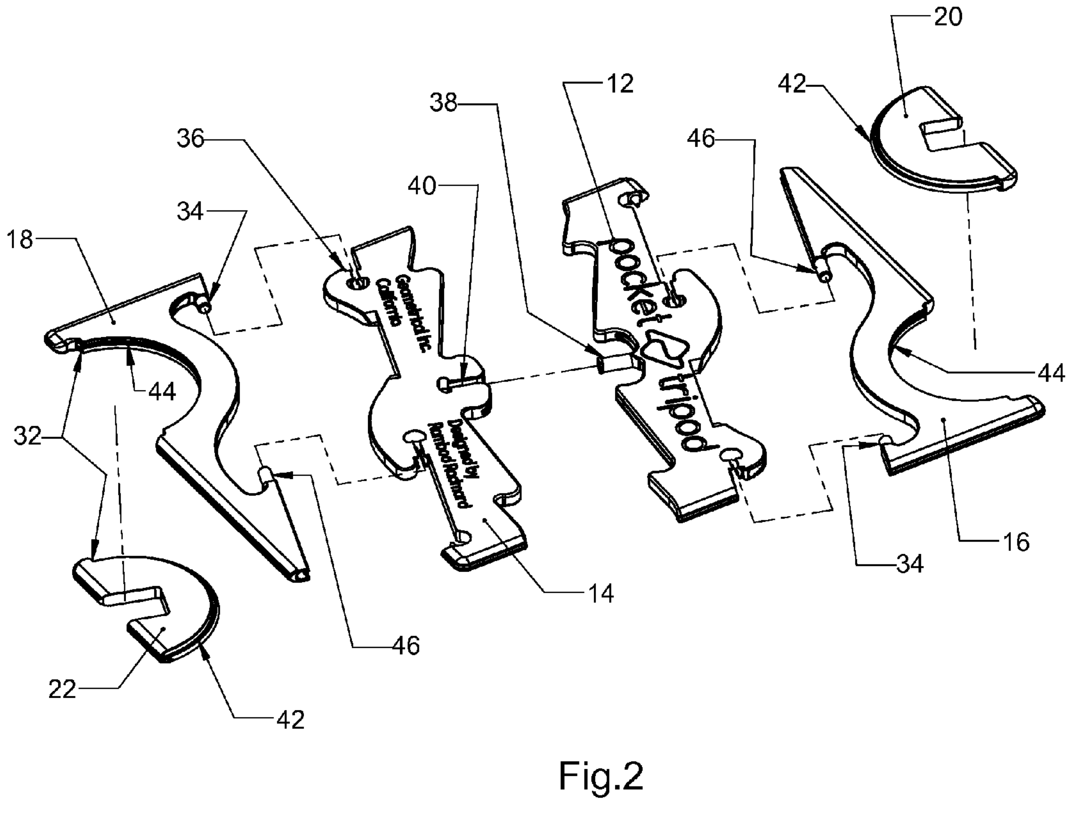
Fig.2

Fig.6
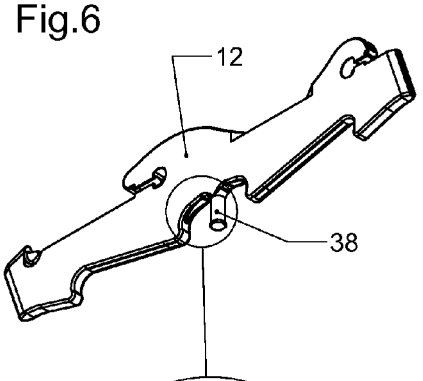
Fig.7
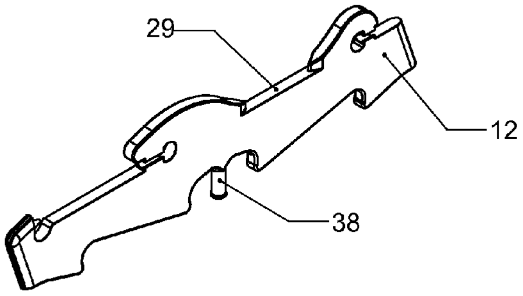
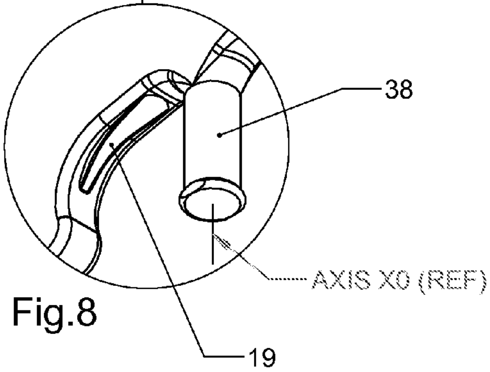
Fig.8
Fig.11
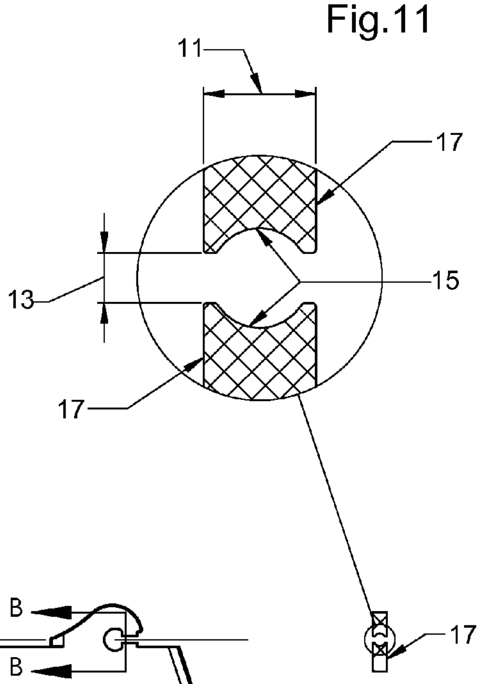
Fig.10
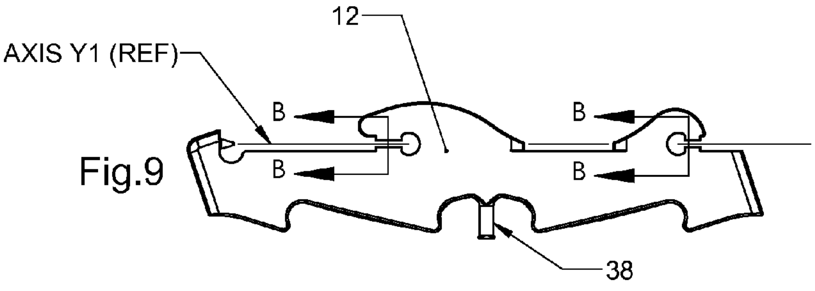
Fig.9
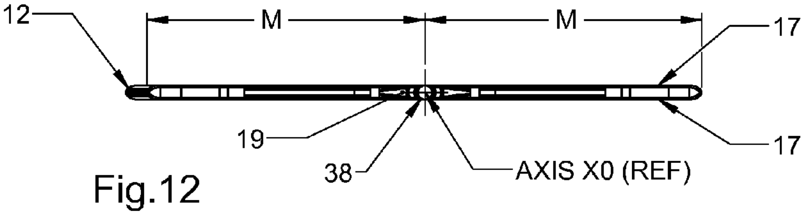
Fig.12

Fig.14
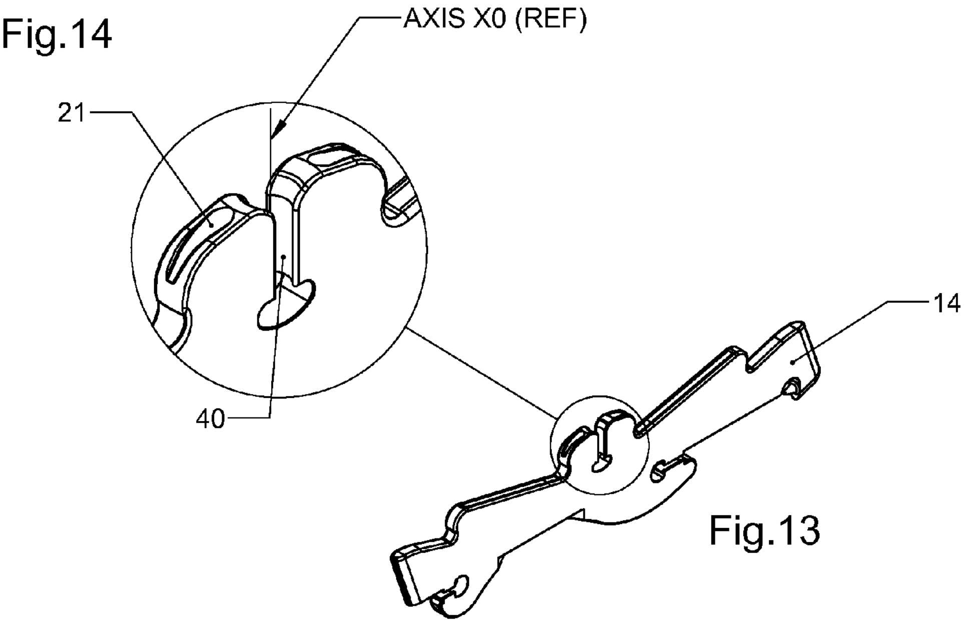
Fig.13
Fig.16
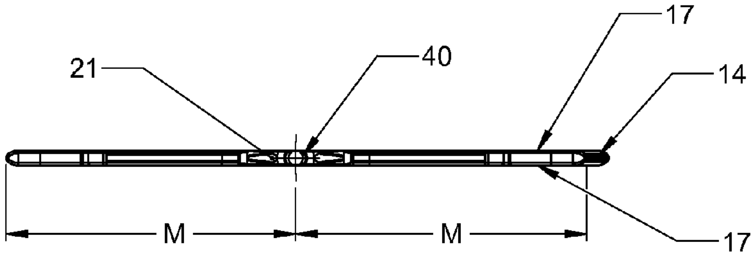
Fig.15
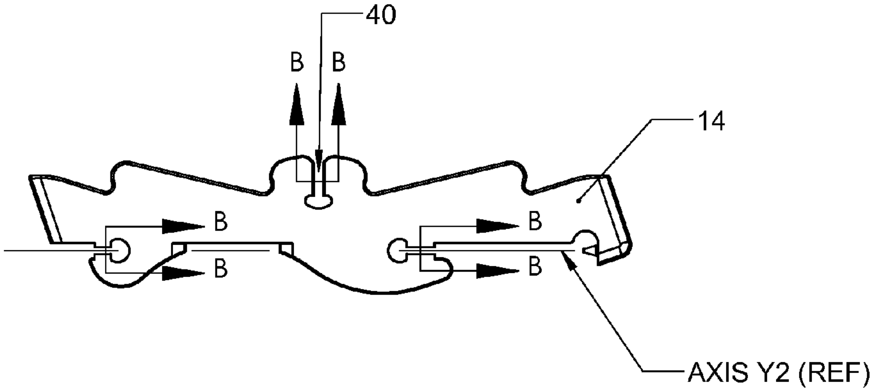

Fig.17
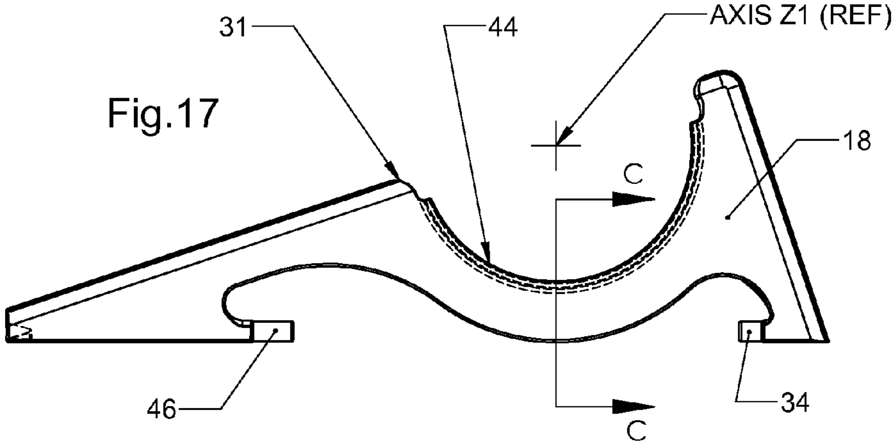
Fig.19
Fig.18
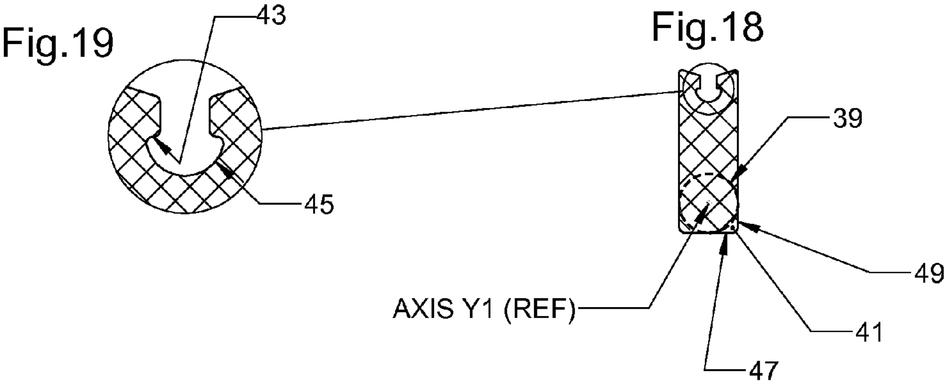
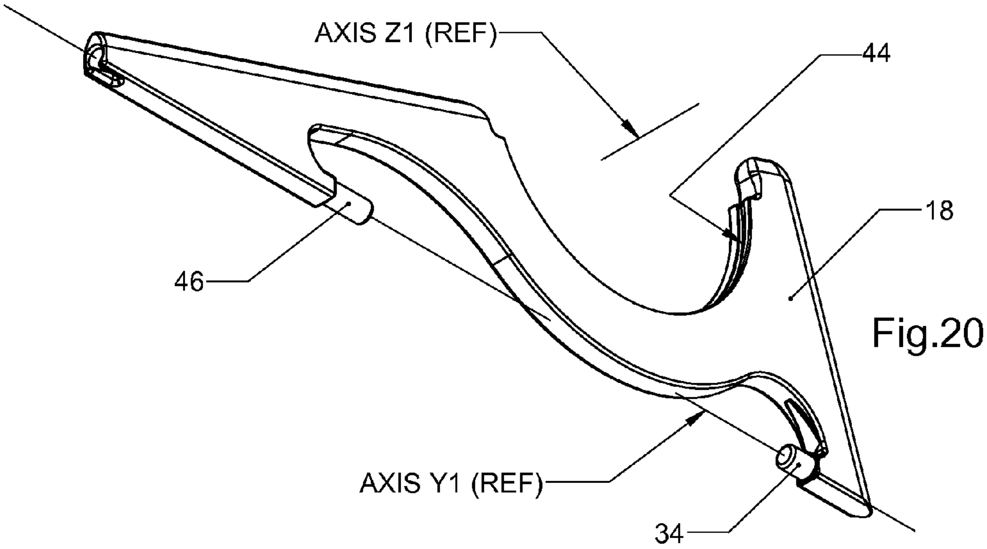
Fig.20

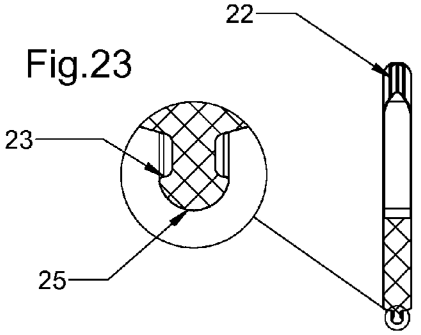
Fig.23
Fig.22
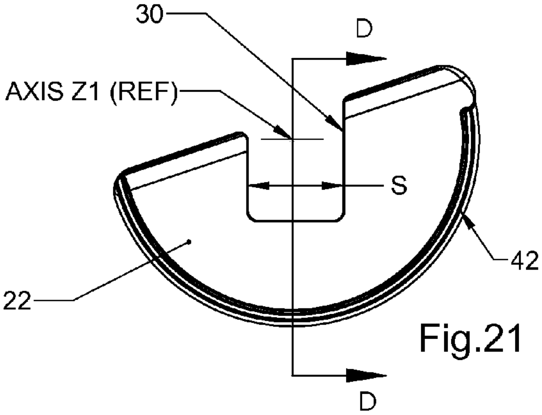
Fig.21
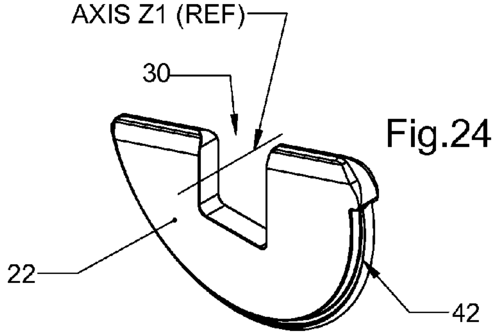
Fig.24
Fig.25
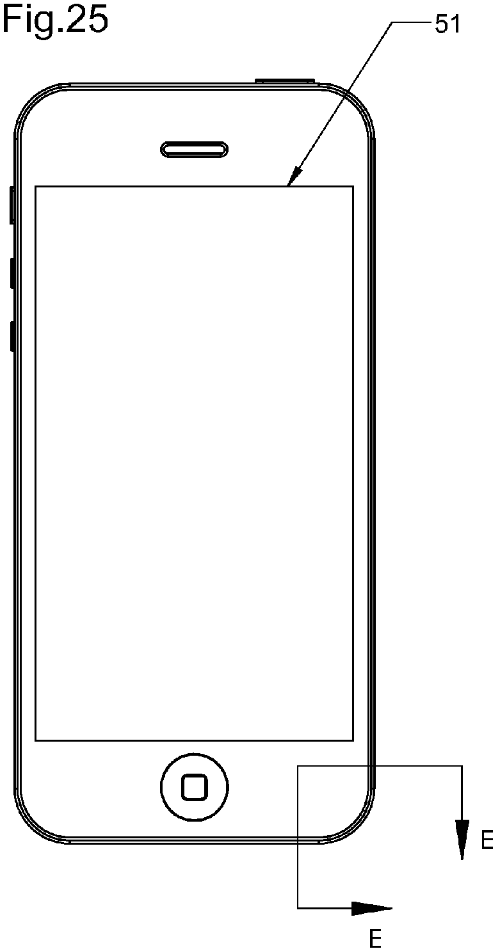
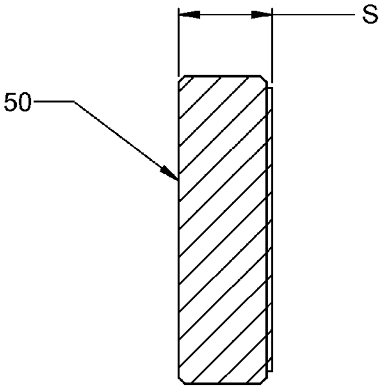
Fig.26

Fig.29
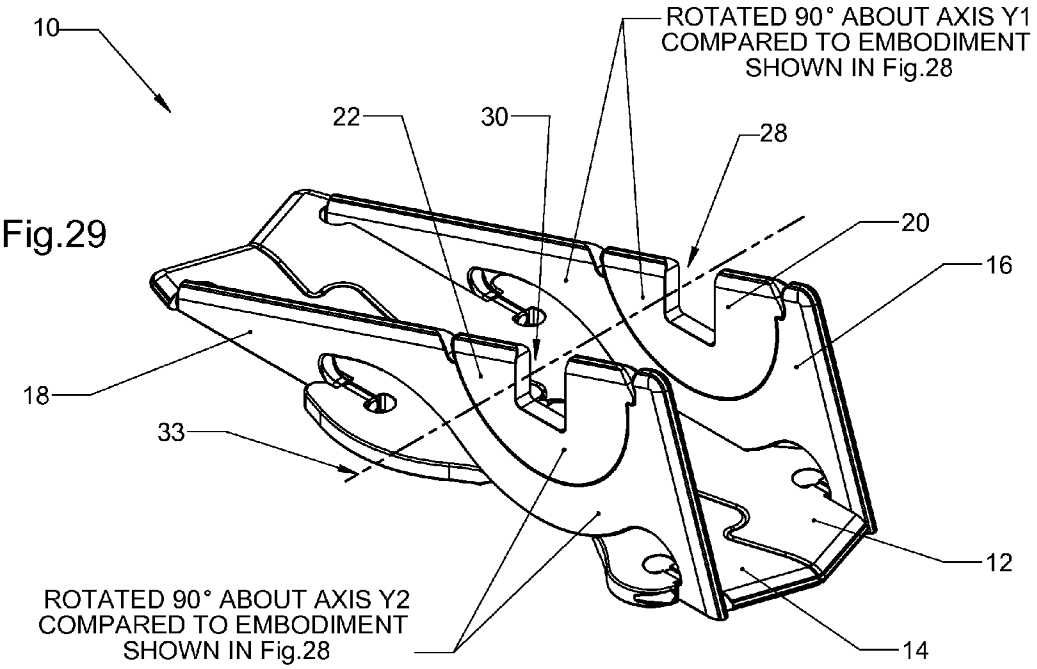
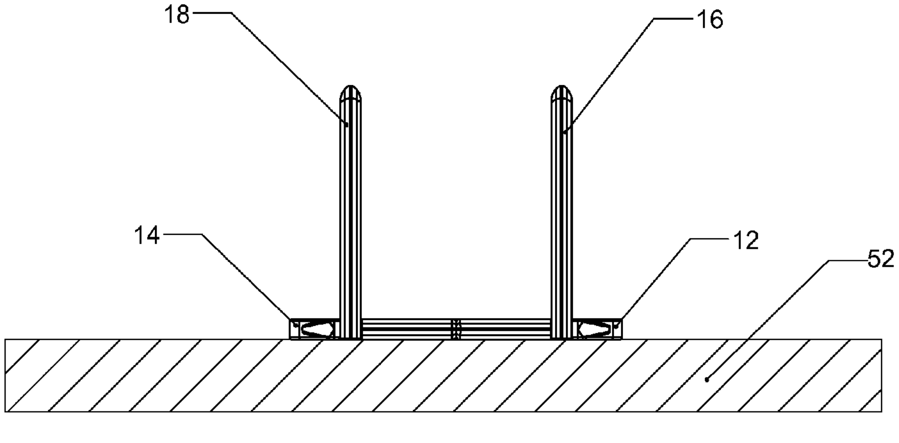
Fig.30

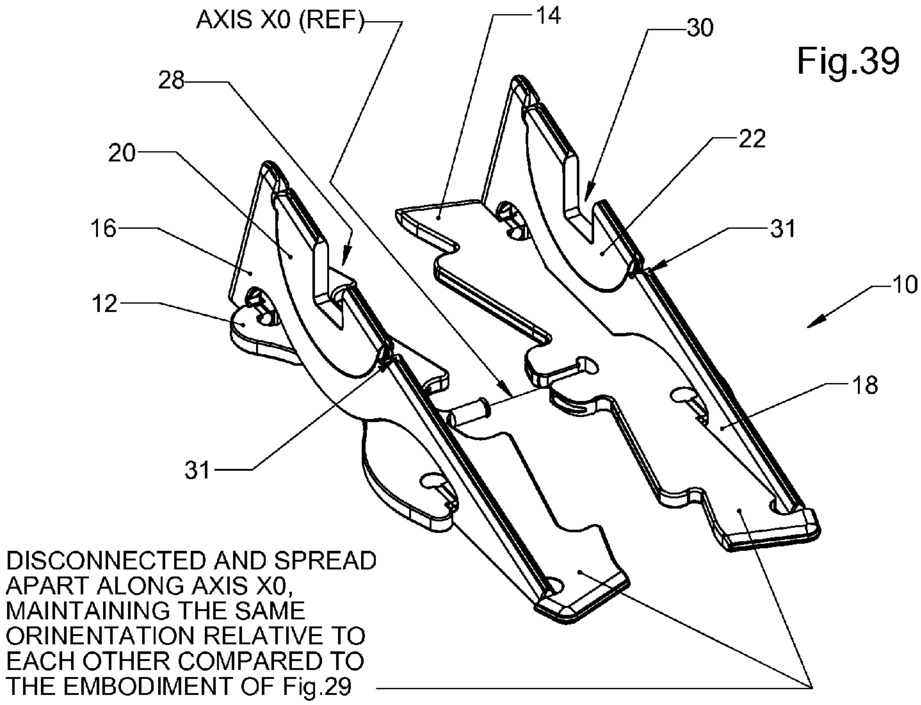
Fig.39
Fig.40
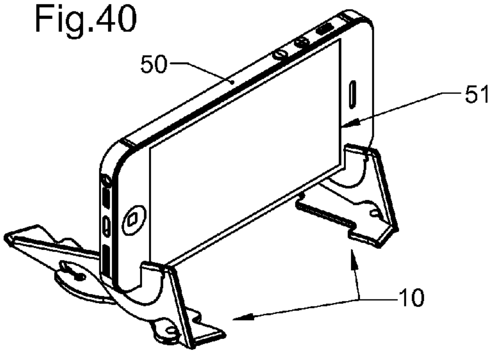
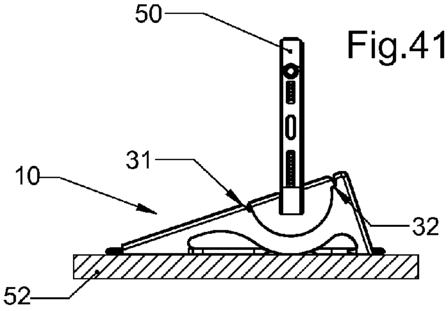
Fig.41
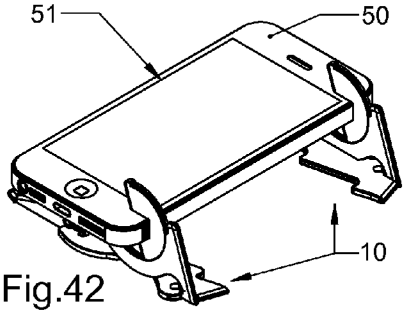
Fig.42
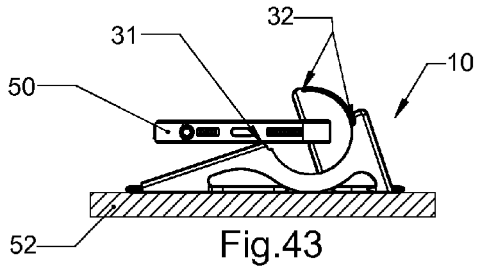
Fig.43

Fig.44
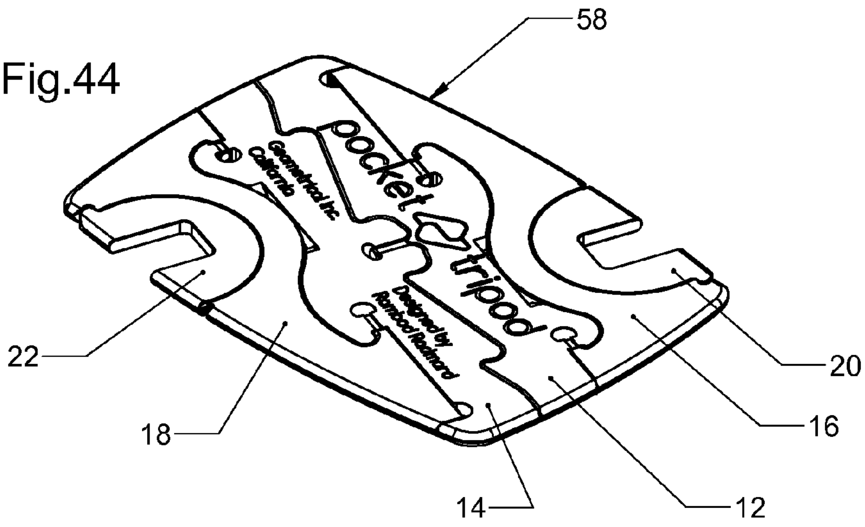
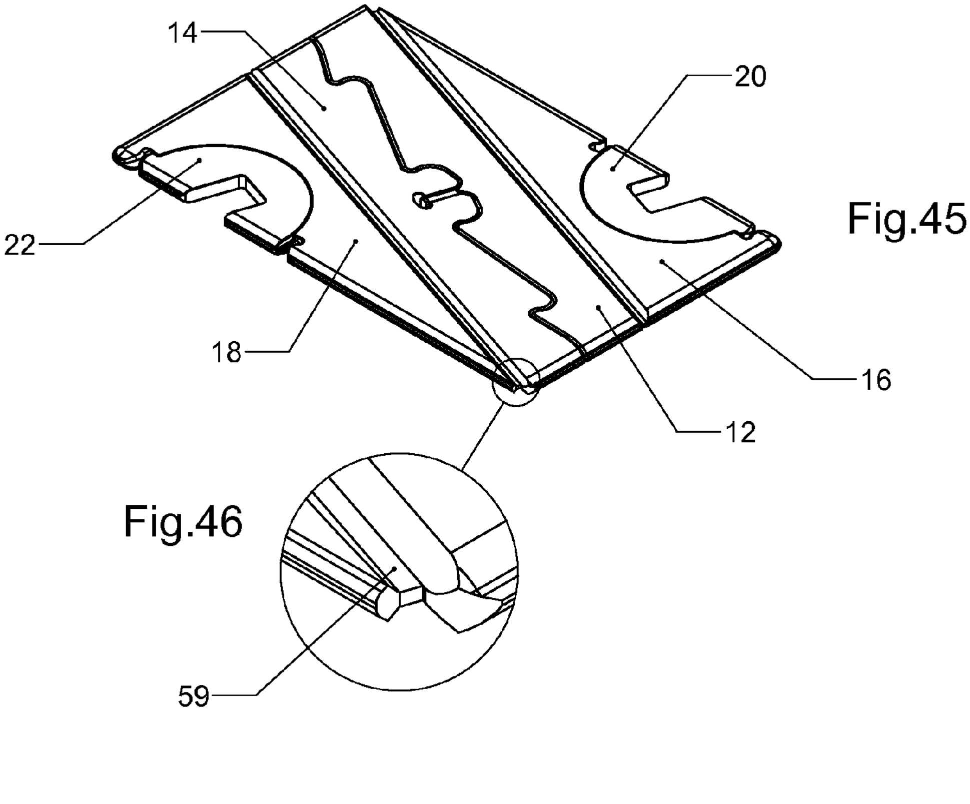
Fig.45
Fig.46

Fig.48
Fig.47
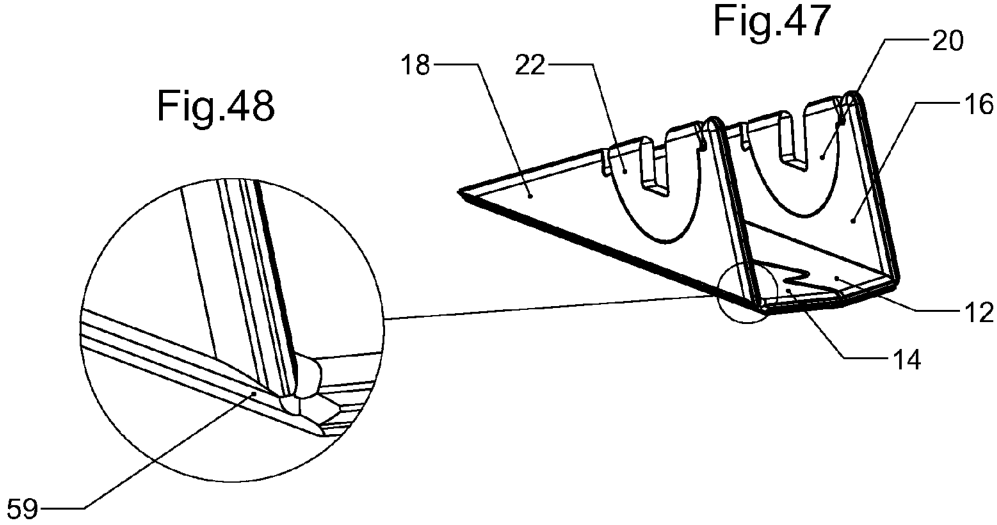
Fig.49
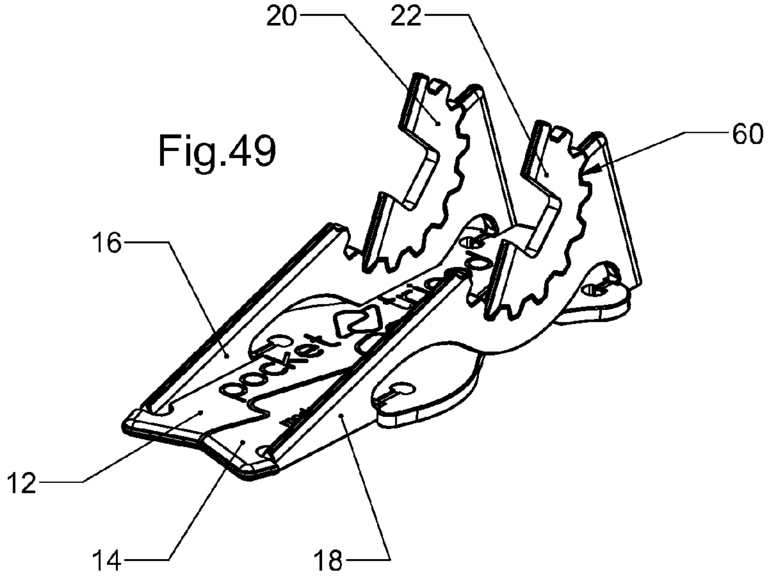

APPARATUS TO SUPPORT PORTABLE ELECTRONIC DEVICES AND OTHER DEVICES OR OBJECTS

CROSS-REFERENCE TO RELATED APPLICATIONS

This application claims priority benefit of U.S. Provisional Patent Application No. 61/617,568, filed Mar. 29, 2012, titled POCKET TRIPOD: Transformable Wallet-Size Articulating Stand for Holding Mobile Devices, the entire disclosure of which is hereby expressly incorporated by reference herein.

BACKGROUND

Applicant's apparatus relates to apparatus and devices for supporting portable electronic devices and other devices or objects, and more particularly to an apparatus that can transform in shape to take the form of a credit card that may be stored and carried in a case for holding cards, such as a wallet.

There are many stands on the market that are able to hold electronic mobile devices. One such stand is known as the Apple IPHONE™ docking station that can hold a device at a predetermined angle in the portrait view, while placed upon a flat surface. Another is the Glif-IPHONE™ 4 Tripod Mount & Stand that can hold a device at predetermined angles and is small enough to fit inside a pocket, and also allows the device to be mounted on a standard tripod. Still other stands include the type that is portable which can fit inside a pocket and allows for articulation of a mobile device to a certain extent, such as the tiltpod. However, these stands are not thin enough to fit inside a wallet for a truly portable apparatus that can also allow the user to position a mobile device at any possible orientation angle in both the landscape and portrait views.

BRIEF SUMMARY

There are various aspects of Applicant's apparatus, and many variations of each aspect.

One aspect is an apparatus to support a device. The apparatus includes a first base, a first support, a first base-support hinge, a first swivel, a second base, a second support, a second base-support hinge, and a second swivel. The first base-support hinge is adapted to rotatably couple the first base and the first support along a first axis of rotation. The first swivel is slidably connected to the first support and has a first cut-out adapted to receive a first portion of the device. The second base-support hinge is adapted to rotatably couple the second base and the second support along a second axis of rotation. The second swivel is slidably connected to the second support and has a second cut-out adapted to receive a second portion of the device spaced apart from the first portion of the device.

In a first variation of the apparatus, at least some of the first and second bases, the first and second supports, and the first and second swivels are adapted to collapse into at least one storage form of the apparatus.

In a variation of the first variation of the apparatus, the first and second bases, the first and second supports, and the first and second swivels are located in one plane. There are a number of variants of this variation.

In one variant of the above variations of the apparatus, a perimeter of the storage form has a shape of a polygon. In a variant of that variant, the shape is rectangular.

In another variant of the above variations of the apparatus, a perimeter of the storage form has a curvilinear shape 58 (FIG. 44). In another variant the storage form has a shape of a credit card that may be stored and carried in a case for holding cards, such as a wallet.

In another variation of the apparatus, the device supported in at least one functional form of the apparatus may be supported in a range of positions that may vary between 0° and 180° as the first and second swivels slidably move and rotate in a same direction about a third axis of rotation.

In another variation of the apparatus, the first base is adjacent the second base in at least one functional form of the apparatus. In another variation, the first base is spaced apart from the second base in at least one functional form of the apparatus.

In yet another variation of the apparatus, at least one of the first base-support hinge and the second base-support hinge is a hinge comprising a pin and an open barrel. In another variation, the first base-support hinge and the second base-support hinge is a living hinge 59 (FIGS. 45-48) comprising a thin flexible strip.

In yet another variation of the apparatus, the first swivel is connected to the first support by at least one gear and/or the second swivel is connected to the second support by at least one other gear.

In another variation of the apparatus, the device may be chosen from a group including a cellular phone, an IPHONE™, an IPAD™, an IPODTOUCH™, an ebook reader, a portable gaming console, or other portable electronic devices.

In still yet another variation of the apparatus, the first swivel is connected to the first support by at least one first curvilinear rail and/or the second swivel is connected to the second support by at least one second curvilinear rail. In a variant of this variation, at least one of the first curvilinear rail and the second curvilinear rail is a rail having a shape that is at least partially circular. In another variant, at least one of the first and second curvilinear rails includes at least one notch.

A second apparatus is similar to the first apparatus or any of the variations discussed above, but includes at least one base-base coupling adapted to couple the first base and the second base. In a variation of the second apparatus, the at least one base-base coupling is a hinge adapted to rotatably couple the first base and the second base.

Another aspect is an apparatus to support a device. The apparatus includes a single base, a first support, a first base-support hinge, a first swivel, a second support, a second base-support hinge, and a second swivel. The first base-support hinge is adapted to rotatably couple the single base and the first support along a first axis of rotation. The first swivel is slidably connected to the first support and has a first cut-out adapted to receive a first portion of the device. The second base-support hinge is adapted to rotatably couple the single base and the second support along a second axis of rotation. The second swivel is slidably connected to the second support and has a second cut-out adapted to receive a second portion of the device spaced apart from the first portion of the device. In a variation of this apparatus, the first swivel is connected to the first support by at least one first curvilinear rail and/or the second swivel is connected to the second support by at least one second curvilinear rail.

Yet another aspect is an apparatus to support a device. This apparatus has a first base, a first support, a first base-support hinge, a first swivel, a second base, a second support, a second base-support hinge, a second swivel, and a base-base coupling. The first base-support hinge is adapted to rotatably couple the first base and the first support along a first axis of rotation. The first swivel is slidably connected to the first support and has a first cut-out adapted to receive a first portion of the device. The second base-support hinge is adapted to rotatably couple the second base and the second support along a second axis of rotation. The second swivel is slidably connected to the second support and has a second cut-out adapted to receive a second portion of the device spaced apart from the first portion of the device. The base-base coupling is adapted to couple the first base and the second base. At least some of the first and second bases, the first and second supports, and the first and second swivels are adapted to collapse into at least one storage form of the apparatus. And, the device supported in at least one functional form of the apparatus may be supported in a range of positions that may vary between 0° and 180° as the first and second swivels slidably move and rotate in a same direction about a third axis of rotation. In a variation of this apparatus, the at least one base-base coupling is a hinge adapted to rotatably couple the first base and the second base.

BRIEF DESCRIPTION OF THE DRAWINGS

Applicant's apparatus and devices will be described by way of example with reference to the accompanying drawings, in which:

FIG. 1 is a schematic isometric view of one embodiment of Applicant's apparatus in its storage form;

FIG. 2 is a schematic exploded isometric view of one embodiment of Applicant's apparatus, with its constituent parts in the orientation of its storage form;

FIG. 6 is a schematic isometric view of one of the constituent parts of Applicant's apparatus which showcases elements that are magnified for clarity and shown in FIG. 8;

FIG. 7 is another schematic isometric view of the part illustrated in FIG. 6, shown from a different angle to showcase an element;

FIG. 8 is a schematic magnified detailed view of elements showcased in FIG. 6 that shows a connection feature with a reference to an axis shown in FIG. 3, as well as another element;

FIG. 9 is a schematic top view of the part illustrated in FIG. 6, indicating the location of section cut B-B, which is shown in FIG. 10 as well as a reference to an axis shown in FIG. 3;

FIG. 10 is a schematic sectional view taken in the direction of lines B-B in FIG. 9, showing a portion of a connection feature which has been magnified for clarity and shown in FIG. 11;

FIG. 11 is a schematic magnified section view of a connection feature shown in FIG. 10, which shows elements related to this feature;

FIG. 12 is a schematic left view of the part shown in FIG. 9 that displays certain dimensions relevant to the geometry of the apparatus;

FIG. 13 is a schematic isometric view of one of the constituent parts of Applicant's apparatus which showcases elements that are magnified for clarity and shown in FIG. 14;

FIG. 14 is a schematic magnified detail view of the elements shown in FIG. 13;

FIG. 15 is a schematic top view of the part shown in FIG. 13, indicating a reference to an axis shown in FIG. 3, as well as the location of section cuts B-B;

FIG. 16 is a schematic right view of the part shown in FIG. 15 that displays certain dimensions relevant to the geometry of the apparatus;

FIG. 17 is a schematic top view of one of Applicant's constituent parts that shows reference to an axis shown in FIG. 3 as well as the location of section cut C-C that is shown in FIG. 18;

FIG. 18 is a schematic sectional view taken in the direction of lines C-C in FIG. 17 that shows elements relevant to the function of Applicant's apparatus as well as connection features that are magnified for clarity and shown in FIG. 19;

FIG. 19 is a schematic magnified cross-section view of a connection feature shown in FIG. 18;

FIG. 20 is a schematic isometric view of the part shown in FIG. 17, showcasing various elements and referencing to an axis shown in FIG. 3;

FIG. 21 is a schematic top view of one of the constituent parts of Applicant's apparatus that showcases various dimensions and elements relevant to the functionality of one embodiment of Applicant's apparatus, with reference to an axis shown in FIG. 3, as well as indicating the location of section cut D-D that is shown in FIG. 22;

FIG. 22 is a schematic section view taken in the direction of the lines D-D of FIG. 21 that shows a connection feature of the part shown in FIG. 21, which has been magnified for clarity and shown in FIG. 23.

FIG. 23 is a schematic magnified cross-section view of a connection feature shown in FIG. 22;

FIG. 24 is a schematic isometric view of the part shown in FIG. 21;

FIG. 25 is a schematic top view of an electronic mobile device that is intended to be held by one embodiment of Applicant's apparatus, which shows the location of section view E-E, shown in FIG. 26;

FIG. 26 is a schematic section view taken in the direction of the lines E-E of FIG. 25 that shows the contours of the cross-section of the electronic mobile device shown in FIG. 25 along with relevant dimensions;

FIG. 29 is a schematic isometric view of another embodiment of Applicant's apparatus in its functional form 10, with notes describing the difference between this form and the form of the apparatus shown in FIG. 28;

FIG. 30 is a schematic front view of one embodiment of Applicant's apparatus of this invention in its functional form 10, shown in FIG. 29, which indicates various components and their relation to one another;

FIG. 39 is a schematic isometric view of one embodiment of Applicant's apparatus in its alternate functional form that has two parts constituting a base of the apparatus disconnected, and with a note describing the difference between this form and the form of the apparatus shown in FIG. 29, and a reference to an axis shown in FIG. 3;

FIG. 40 is a schematic isometric view of one embodiment of Applicant's apparatus in its alternate functional form of FIG. 39, while holding an electronic mobile device, in landscape view, at a default orientation that the electronic mobile device takes when the apparatus is manipulated from its storage form by the user to take its functional form, which corresponds to the first of two tilt-angle limits, for this embodiment;

FIG. 41 is a schematic left view of the assembly shown in FIG. 40, which shows the electronic mobile device edge on for a view of its tilt angle;

FIG. 42 is a schematic isometric view of another embodiment of Applicant's apparatus in its alternate functional form of FIG. 41, while holding an electronic mobile device, in landscape view, at a second limit of orientation that the electronic mobile device can take; and FIG. 43 is a schematic left view of the assembly shown in FIG. 42, which shows the electronic mobile device edge on for a view of its tilt angle.

FIG. 44 is a schematic isometric view of one embodiment of Applicant's apparatus in its storage form, wherein the perimeter of the said storage form has a curvilinear shape;

FIG. 45 is a schematic isometric view of one embodiment of Applicant's apparatus in its storage form, showcasing living hinge connection features that are magnified for clarity and shown in FIG. 46;

FIG. 46 is a schematic magnified view of a connection feature shown in FIG. 45;

FIG. 47 is a schematic isometric view of one embodiment of Applicant's apparatus in its functional form, showcasing living hinge connection features that are magnified for clarity and shown in FIG. 48;

FIG. 48 is a schematic magnified view of a connection feature shown in FIG. 47;

FIG. 49 is a schematic isometric view of one embodiment of Applicant's apparatus in its functional form, indicating the use of gears.

DETAILED DESCRIPTION

Figure 53:
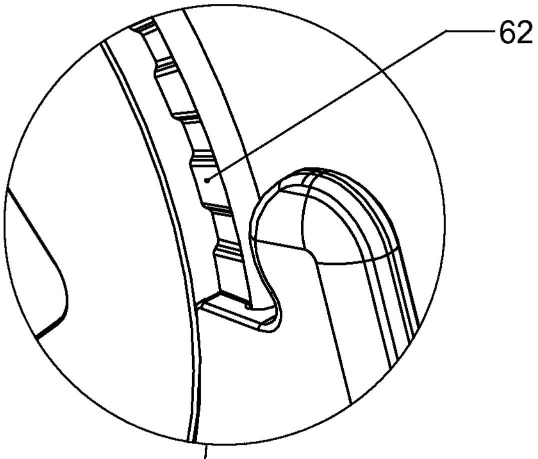
FIG. 53 is a schematic magnified view of notches shown in FIG. 52.
Figure 52:
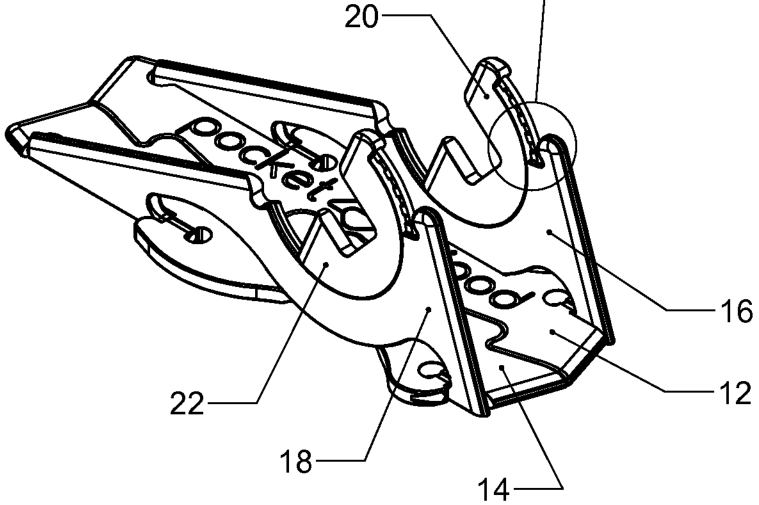
FIG. 52 is a schematic isometric view of one embodiment of Applicant's apparatus in its functional form, indicating the use of notches that are magnified for clarity and shown in FIG. 53.

Several embodiments of Applicant's apparatus are shown in FIGS. 1-53, including embodiments of the apparatus in various forms and supporting a device in various positions. Persons skilled in the art will recognize that Applicant's apparatus may also take other forms. Such persons will also recognize that the various types of the apparatus may have various sizes and shapes. In addition, such persons will recognize that the apparatus illustrated in FIGS. 1-53 may take forms other than that shown in FIGS. 1-53, as discussed herein.

In one embodiment, Applicant's apparatus may be designed for holding mobile devices at user-defined orientations and angles while placed on top of flat surfaces (or other surfaces), with a collapsible structure, which can be manipulated by the user to take the form and approximate dimensions of a 3⅛ by 2⅛ inch credit card, so that it may be stored and carried in cases for holding cards, such as a wallet. The slim storage profile of the apparatus in this embodiment allows it to be carried by the user at all times, and available when needed.

In one embodiment, Applicant's apparatus may be comprised of at least six connected parts made of plastic or a material with similar properties to allow for its constituent parts to snap into their intended positions. Constructing the apparatus from plastic also allows for easy assembly and for low cost, mass-manufacturing. The structural flexibility of the apparatus also allows for comfortable and durable storage.

Applicant's apparatus may take several forms, including a storage form 56 (FIG. 1) and a functional form 10 (FIG. 29). In the storage form 56, one embodiment of the apparatus occupies a rectangular envelope of approximately 3⅛ by 2⅛ inches with a thickness of approximately 0.090 inches. The edge of this rectangular envelope is tapered all around to allow for the user to easily slip the apparatus into a wallet's storage compartment intended for holding standard credit cards. Applicant's apparatus may be manipulated by the user to take the form of a functional stand 10. To reach this form, the user snaps into place the components of the apparatus to predefined positions. The action of transforming the apparatus from the storage form to the functional form requires no assembly by the user, because the movements of the parts are guided by hinges that keep the parts connected together. The guided transformation between the two forms allows for simple operation and quick deployment of the apparatus when needed, with minimum learning required by the user, and eliminating the risk of losing parts of the apparatus.

When the apparatus has been transformed into a functional form, the user may place a mobile device inside slots on the apparatus that are of predetermined dimensions, corresponding to the cross section of the edge of a mobile device. The slots that the mobile device is placed in are cut-outs in a pair of parts of the apparatus that are capable of swiveling about a common center. The swiveling about a common center of two parallel parts with cut-outs for the mobile device allows the user to have control over the orientation of the mobile device by adjusting its viewing angle to any desired angle, in both the landscape and portrait directions of the mobile device. In one embodiment, this swivel motion is guided by circular rails that engage between the swivel parts and corresponding support parts, which are parallel to one another while in the functional form, and are hinged to a base of the apparatus, which may be placed upon a flat surface (or other surface) while in operation.

While in the functional form, the motion of mobile device held by the apparatus may be limited by stoppers that are part of the structure of the apparatus, which stoppers may be placed on both the front and rear sides of the mobile device. The purpose of the stoppers is to keep the center of gravity of the mobile device within the limits of the base of the apparatus to insure mechanical stability during operation.

The embodiment of Applicant's apparatus illustrated in FIG. 1 is comprised of six separate parts assembled together into one unit. The six separate parts are:

a first Base, shown in FIG. 1 as element 12;

a second Base, shown in FIG. 1 as element 14;

a first Support, shown in FIG. 1 as element 16;

a second Support, shown in FIG. 1 as element 18;

a first Swivel, shown in FIG. 1 as element 20; and a second Swivel, shown in FIG. 1 as element 22.

Figure 4:
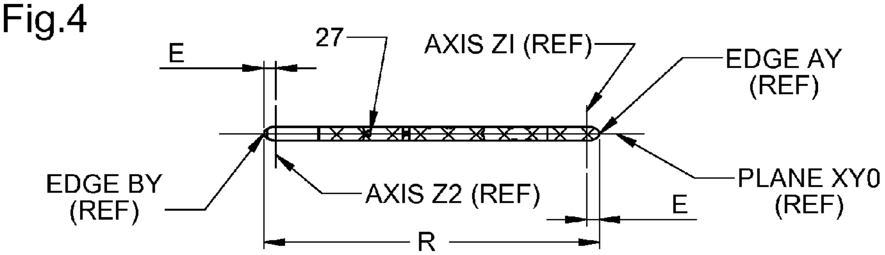
FIG. 4 is a schematic sectional view taken in the direction of lines A-A in FIG. 3.
Figure 3:
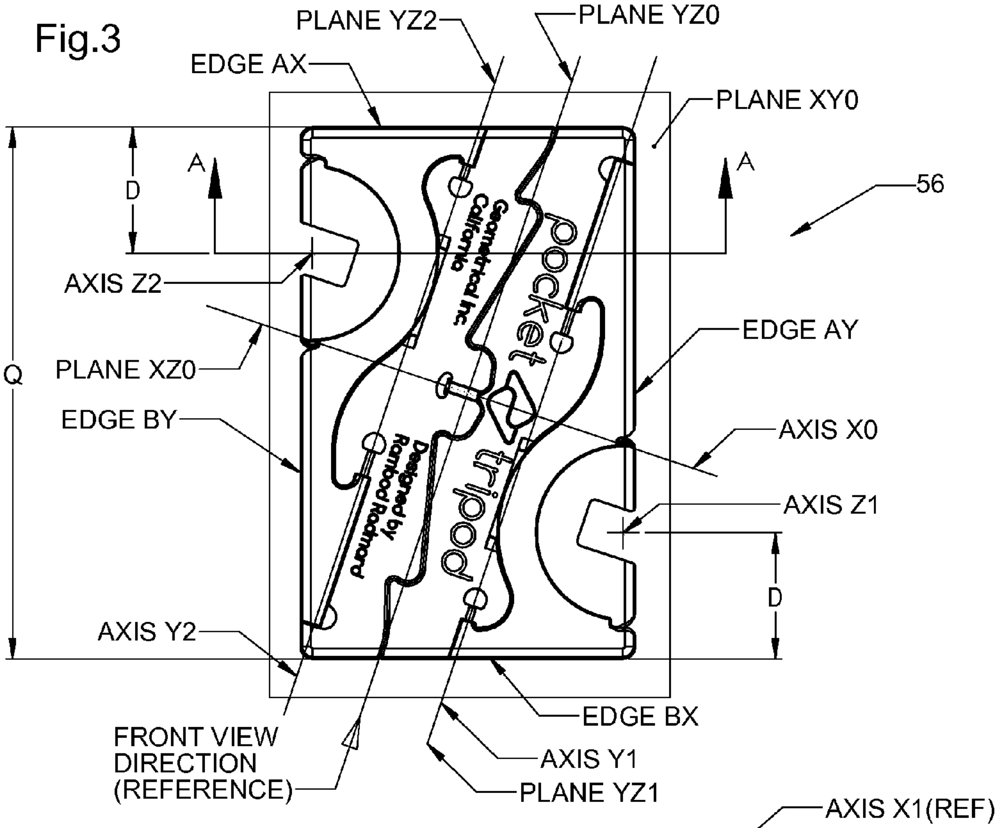
FIG. 3 is a schematic view of one embodiment of Applicant's apparatus in its storage form, indicating the positions of the axes of movement of the constituent parts, and indicating the location of section cut A-A, that is shown in FIG. 4, as well as the conventional direction of the "Front View" of the apparatus of this invention shown in FIG. 5.
Figure 5:
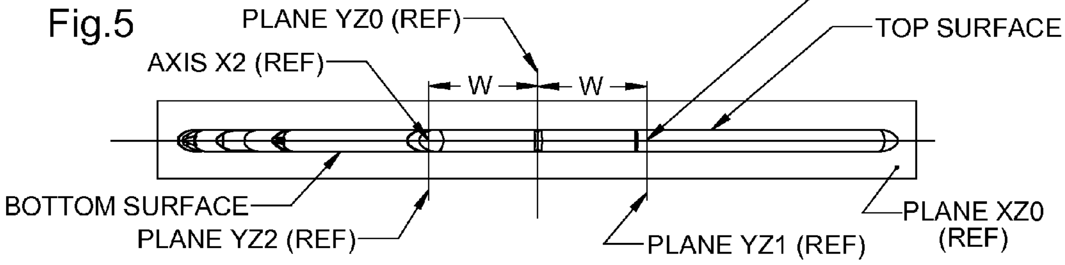
FIG. 5 is a schematic front view of the apparatus shown in FIG. 3.

The reference planes and axes of one embodiment of Applicant's apparatus are shown in FIGS. 3, 4 and 5, and are as follows:

Top Surface, which is the surface of one of the two flat sides of the apparatus in its storage form 56, conventionally chosen as the top side, which is parallel to the bottom surface.

Bottom Surface, which is the surface of one of the two flat sides of the apparatus in its storage form 56, conventionally chosen as the bottom side, which is parallel to the top surface.

Plane XY0, is the plane parallel to and midway between the top and bottom surfaces.

Plane YZ0, which is the plane perpendicular to Plane XY0, along the semi-diagonal line that splits the rectangular profile of the apparatus in storage form in two equal halves that are in the shape of right trapezoids.

Plane YZ1, which is the plane parallel to and at a predetermined distance W away from Plane YZ0.

Plane YZ2, which is the plane parallel to and at a distance W away from Plane YZ0 in the opposite side of Plane YZ1 from Plane YZ0.

Plane XZ0, which is the plane perpendicular to Plane XY0 and Plane YZ0 coincident with the geometrical center of the rectangular envelope of the apparatus in its storage form.

Axis X0, which is the axis along the intersection of Plane XZ0 and Plane XY0.

Axis Y1, which is the axis along the intersection of Plane YZ1 and Plane XY0.

Axis Y2, which is the axis along the intersection of Plane YZ2 and Plane XY0.

Axis Z1, which is an axis normal to Plane XY0 at predetermined distances D and E from edges BX and AY respectively.

Axis Z2, which is an axis normal to Plane XY0 at predetermined distances D and E from edges AX and BY respectively.

The first Base 12 and the second Base 14 are connected to each other, and have one degree of freedom of rotational motion relative to one another about Axis-X0. First Base 12 and second Base 14 are each connected to first Support 16 and second Support 18 respectively. First Base 12 and first Support 16 have one degree of rotational motion relative to each other about Axis-Y1. Second Base 14 and second Support 18 have one degree of rotational motion relative to each other about Axis-Y2. First Swivel 20 is connected only to first Support 16, with one degree of rotational motion relative to each other, about Axis-Z1. Second Swivel 22 is connected only to second Support 18, with one degree of rotational motion relative to each other, about Axis-Z2. Each Swivel (20, 22) has a slot or cut-out (28, 30) in the shape of the cross section of the device 50 (FIGS. 25, 26), in which the device may be placed. First Swivel 20 and second Swivel 22 are mirrors of each other geometrically, with identical contours when placed on top of one another. The same applies to first Support 16 and second Support 18, which are also mirror copies of each other. For this reason, only of one the two Support and Swivel parts have been illustrated in FIGS. 17-20 and FIGS. 21-24.

A further description of illustrative embodiments of Applicant's apparatus 10 follows. As these embodiments are described with reference to the drawings, various modifications or adaptations of the methods and/or specific structures described may become apparent to those skilled in the art. All such modifications, adaptations, or variations that rely upon the teachings herein, and through which these teachings have advanced the art, are considered to be within the spirit and scope of Applicant's apparatus. For example, Applicant's apparatus has been characterized herein as a stand to hold electronic mobile devices such as cell phones, but it is apparent that other devices such as point-and-shoot digital cameras or even non-electronic objects, such as a stack of business cards, may be held by Applicant's apparatus as well. Hence, these descriptions and drawings are not to be considered in a limiting sense, as it is understood that Applicant's apparatus is not limited to the embodiments illustrated.

In one embodiment, Applicant's apparatus 10 can be placed upon a flat surface (or other surfaces), for holding devices at angles determined by the user, and can be unfolded to take the shape and size of a credit card, allowing it to be stowed away when not in use.

Most stands used for holding mobile devices are designed to have predetermined operation angles, for example 45 degrees or 60 degrees. These angles may be in a range convenient for viewing the screen of the device, but prohibit the user to set specific angles to the device in situations where these angles are important, such as using the device to capture videos or pictures; or with specific applications that capture the device's sensor information, such as the information gathered from its accelerometers, in which case the user might need to match the axes of the device with those of its surroundings. Applicant's apparatus 10 provides for adjustable operation angles that can overlap in range to allow the user to set the device at any angle needed, in addition to allowing the user to position the mobile device in both landscape and portrait views.

In one embodiment, Applicant's apparatus 10 can be flattened into the general shape and dimensions of a standard credit card, to allow the apparatus 56 to be stowed away in a pocket compartment of a wallet intended to hold credit cards, allowing for convenient mobility and availability when needed. The shape and materials are crafted to provide reliable and quick deployment of the Applicant's apparatus from the storage form 56 to the functional form 10 and vice versa. To allow for quick and easy deployment of the apparatus 10 from its storage form 56 and vice versa, its comprising parts are designed in a way to allow the user to snap them into position. The parts are made of plastic or a material with similar properties, and are connected to each other using hinges that guide the movement of the parts relative to one another. This allows the user to snap the parts into position with minimum skill and learning required.

One embodiment of Applicant's apparatus 10 is made up of at least six parts, as previously discussed. The purpose of the first Base 12 and second Base 14 is to have a base that the stand can use to rest against a surface that it is placed upon, such as in FIG. 30. Together the first and second Bases (12, 14) act as a hinge 26 that the two halves of the apparatus can rotate about so as to allow it to begin transforming from the functional to the storage form and vice versa. The first and second Supports (16, 18) are intermediary components between their respective Bases (12, 14) and Swivels (20, 22) that hold the mobile device 50. The first and second Supports (16, 18) transfer the forces between these two sets of parts and are used to limit the motion of the mobile device 50 with stoppers 31 and 32. Said Supports have circular rails 44 that when engaged with their counterpart circular rails 42 on the first and second Swivels (20, 22) allow those parts to swivel about their common centers of rotation. The first and second Swivels (20, 22) are responsible for holding the mobile device 50 inside their cut-outs (28, 30) and swivel to allow the user to position the mobile device 50 at the desired orientation angle.

The design of the Applicant's apparatus allows it to transform from the shape of a card 56 to the shape of a stand 10. When in storage form 56, the apparatus occupies the shape of a card, so that it may be stored in a wallet. To transform the apparatus 56 from this form to the functional form of a stand 10 that may hold electronic mobile devices, the parts need to be moved into the appropriate positions.

Figure 28:
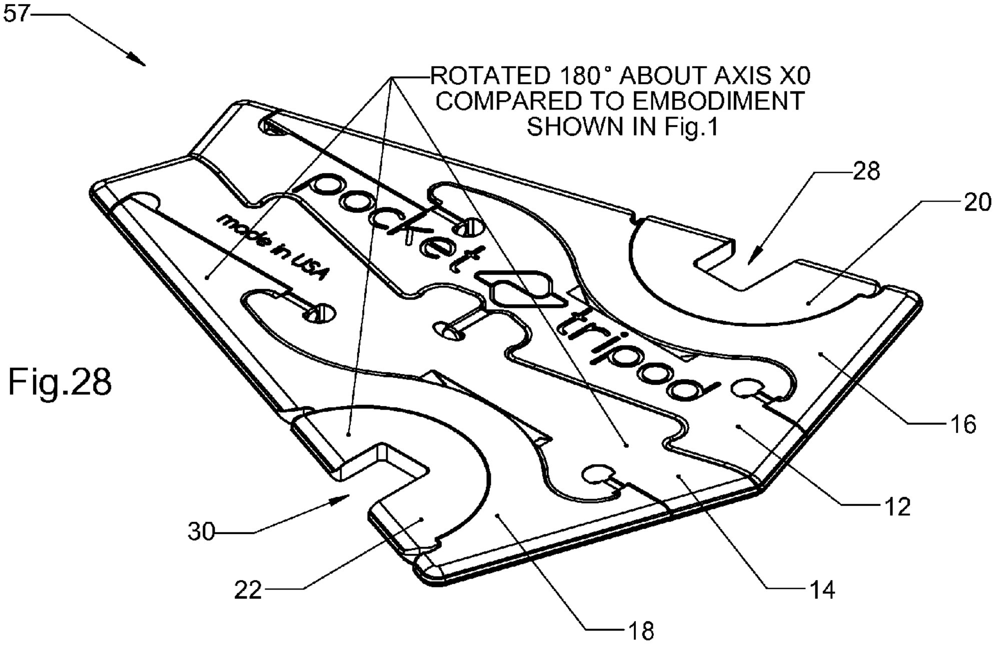
FIG. 28 is a schematic isometric view of the apparatus in its transformation form 57, shown in FIG. 27 with indications to various elements relating to the function of the apparatus, with notes describing the difference between this form and the form of the apparatus shown in FIG. 1.
Figure 31:
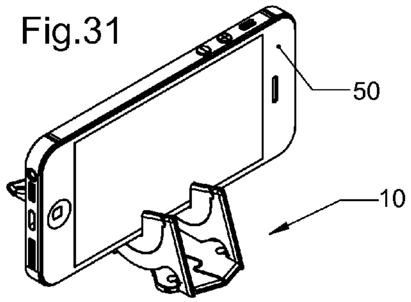
FIG. 31 is a schematic isometric view of one embodiment of Applicant's apparatus in its functional form, while holding an electronic mobile device, in landscape view, at a default orientation that the electronic mobile device takes when the apparatus is manipulated from its storage form by the user to take its functional form, which corresponds to the first of two tilt-angle limits for this embodiment.
Figure 32:
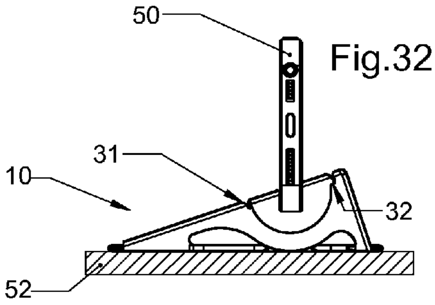
FIG. 32 is a schematic left view of the assembly shown in FIG. 31, which shows the electronic mobile device edge on for a view of its tilt angle.
Figure 33:
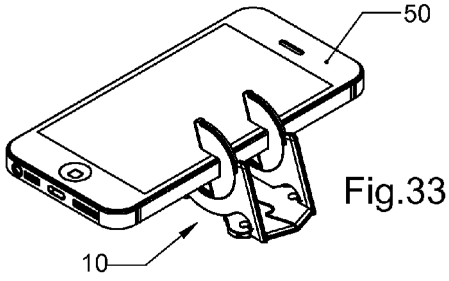
FIG. 33 is a schematic isometric view of one embodiment of Applicant's apparatus of this invention in its functional form, while holding the electronic mobile device, in landscape view, at a second tilt-angle limit that the electronic mobile device can take.

From the storage form, first Base 12 and second Base 14 must rotate 180 degrees about Axis-X0 relative to one another, guided by hinge 26. Since the first Support 16 and the first Swivel 20 are extensions of the first Base 12, and the second Support 18 and the second Swivel 22 are extensions of the second Base 14, when the first and second Bases 12 and 14 rotate 180 degrees relative to one another, so do their respective Support (16, 18) and Swivel (20, 22) parts, as shown in FIG. 28. When the 180 degree rotation is near completion, the first and second Bases (12, 14) snap into the correct position because due to interlocking interface geometries such as protrusion 19 and indent 21 which are on the first Base 12 and the second Base 14 respectively, as shown in FIGS. 8 and 14. Both the first and second Bases have complementing features along their interfaces that are placed at equal distances on either side of plane XZ0 so that they would realign again after the 180 degree rotation has been completed. The entire surface in contact between the two Bases (12, 14) occupies the same distance M away from the axis of rotation X0 on either side of plane XZ0, when viewed in the direction of that axis, for the aforementioned reason, as seen in both FIG. 12 and FIG. 16.

Figure 27:
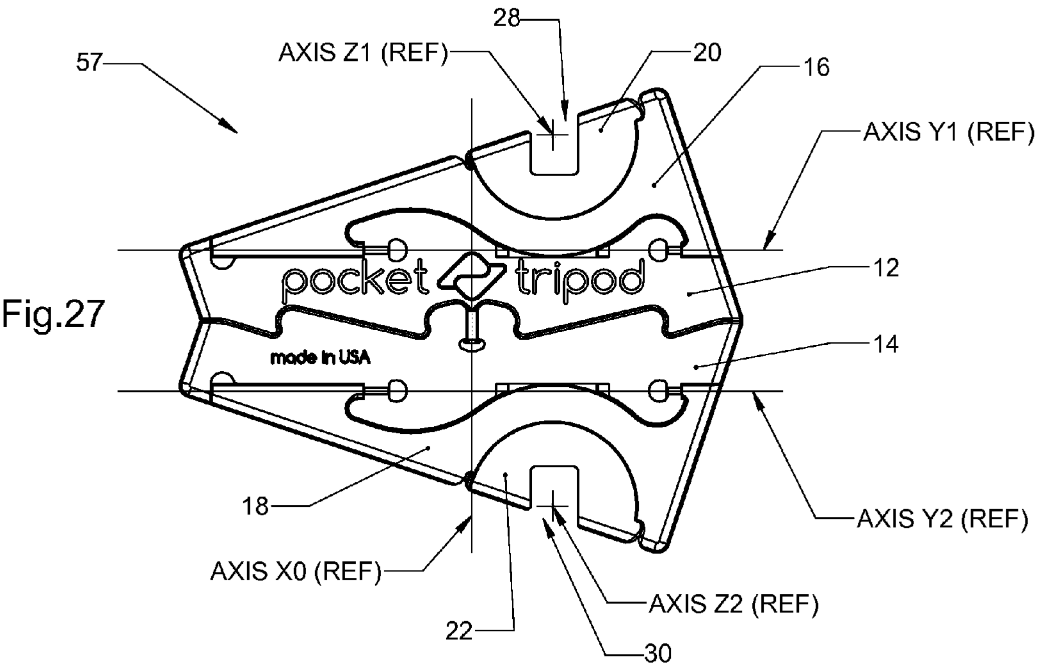
FIG. 27 is a schematic top view of another embodiment of Applicant's apparatus in its transformation form 57—an intermediary form between its storage and functional form—indicating references to all the axes of motion relevant to the movements of the parts of the apparatus, previously shown in FIG. 3.

Once the two Bases (12, 14) have been snapped into the 180 degree position, also known as the transformation form 57 (FIG. 27-28), the user may rotate both Supports (16, 18) towards the same direction, either towards the Top Surface or the Bottom Surface. First Support 16 must rotate 90 degrees relative to first Base 12 about Axis-Y1, and second Support 18 must rotate 90 degrees compared to second Base 14 about Axis-Y2. Similar to the Bases (12, 14), the Supports (16, 18) also will snap into the appropriate position when nearing the completion of their 90 degree rotation due to features on these parts, such as features 29 and 41, shown in FIGS. 7 and 18. Once the Supports (16, 18) have been snapped into their 90 degrees position, they would both be pointing in the same direction and parallel to one another and perpendicular to the Bases (12, 14), as shown in FIG. 29. Since the first Swivel 20 is an extension of the first Support 6 and the second Swivel 22 is an extension of the second Support 18, by default, when the Supports (16, 18) complete their 90 degrees rotation, both the first Swivel 20 and the second Swivel 22 would have also rotated 90 degrees about Axis-Y1 and Axis-Y2 respectively. This means that both Swivel parts (20, 22) are parallel to one another at this stage, their cut-outs (28, 30) match each other, and Axes Z1 and Z2 are collinear along axis 33, as shown in FIG. 29. This will allow the user to place a mobile device 50 that this particular apparatus 10 was intended for, inside the cut-outs (28, 30) that match the contour of the cross section of the mobile device 50, such as shown in FIG. 26. At this stage the user may swivel the mobile device 50 so that it may take any orientation angle. This would be possible because both Swivel parts (20, 22) swivel about Axes Z1 and Z2, which at this stage are collinear.

The apparatus 10 is now in the "functional form" stage. The Swivel parts (20, 22) are held in place and are able to swivel due to the rails (42, 44) in both the Swivel parts (20, 22) and the Support parts (16, 18). Although the rails (42, 44) are illustrated as circular rails in the embodiments shown in the drawings, persons skilled in the art will recognize that the rails may take many other shapes, particularly other curvilinear shapes or at least partially curvilinear in shape.

In the embodiments shown in the drawings, each combined rail is comprised of a male side 42 (FIG. 24) and a female side 44 (FIG. 20), both of which are circular, concentric, and with the same rail cross sections 25 (FIG. 23) and 45 (FIG. 19), on both the Swivel parts (20, 22) and the Support parts (16, 18) respectively. The rails (42, 44) are an assembly of two parts, one on each of the Swivels parts (20, 22) and the Support parts (16, 18). The components of each rail assembly (42, 44) are locked into each other due to overhanging walls 43 (FIG. 19) and flared contours 23 (FIG. 23), as shown in the cross-section of the rail assembly 27 (of FIG. 4). This kind of interlocking engagement restricts the movements of the support parts (16, 18) and the swivel parts (20, 22) in relation to one another to the circular path of the rail (42, 44) along the interface of these two parts.

This controlled movement enables fine adjustments to the tilt angle of the mobile device 50 by the user without having to remove the device from the apparatus 10. This is due to the fact that the mobile device 50 held within the cut-outs (28, 30) in essence becomes a component of one of the two parts of a hinge; one that has its axis of rotation along the two Z axes, and like any hinge is made of two main parts. One part is the combination of the Support parts (16, 18) and the Base parts (12, 14), and the other part is the combination of the Swivel parts (20, 22) and the mobile device 50. Using the design of the rails (42, 44) in an apparatus 10 for holding mobile devices 50 is an example of the application of such rails with slim profiles.

Figure 34:
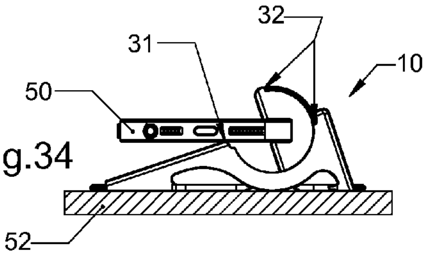
FIG. 34 is a schematic left view of the assembly shown in FIG. 33, which shows the electronic mobile device edge on for a view of its tilt angle.
Figure 35:
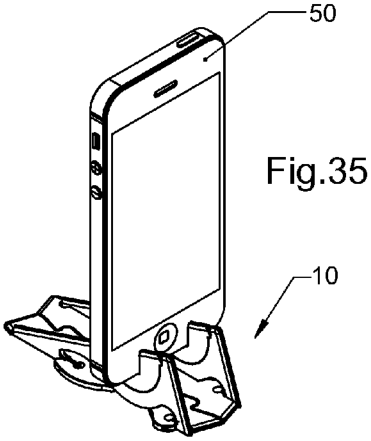
FIG. 35 is a schematic isometric view of another embodiment of Applicant's apparatus in its functional form, while holding the electronic mobile device, in portrait view, at a default orientation that the electronic mobile device takes when the apparatus is manipulated from its storage form by the user to take its functional form, which corresponds to the first of two tilt-angle limits for this embodiment.
Figure 36:
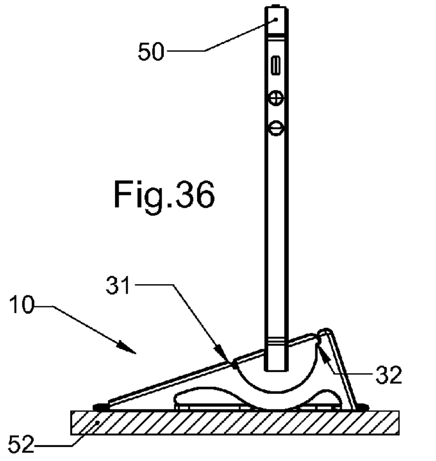
FIG. 36 is a schematic left view of the assembly shown in FIG. 35, which shows the electronic mobile device edge on for a view of its tilt angle.
Figure 37:
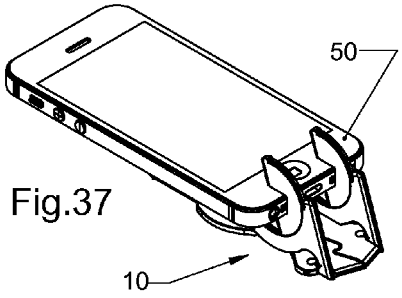
FIG. 37 is a schematic isometric view of another embodiment of Applicant's apparatus of this invention in its functional form, while holding an electronic mobile device, in portrait view, at a second tilt-angle limit that the electronic mobile device can take.
Figure 38:
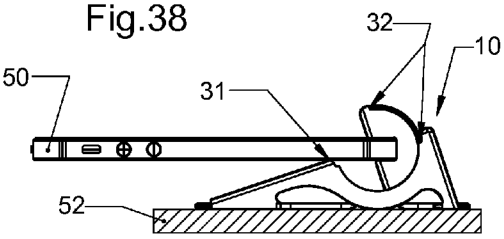
FIG. 38 is a schematic left view of the assembly shown in FIG. 37, which shows the electronic mobile device edge on for a view of its tilt angle.

At certain tilt angles, the center of gravity of the mobile device 50 may extend out of the range of the contact zone of the Base parts (12, 14) and the flat surface 52 that the apparatus 10 may be placed upon, as in FIG. 34. To maintain mechanical stability, stoppers 32 can be placed near the ends of the rails (42, 44), as shown in FIG. 2, to limit the motion of the mobile device 50 within that zone. Once the apparatus 10 is in the functional form, the user may place the mobile device 50 in either landscape or portrait views, and swivel the device 50 to take any tilt-angle between the limits of the stoppers 32, and the angle where the mobile device 50 meets the surface 31, shown in FIG. 17.

When the apparatus 10 is in the functional form, the user may separate the two Base parts (12, 14) from one another and spread them apart, so that the Swivel parts (20, 22) are in contact with the mobile device 50 on either side of the screen area 51 (FIGS. 40, 42) so that the user may view the screen of the mobile device 50 without any parts of the stand interfering with the view. Embodiments of this functional form are shown in FIG. 39 and in use with the mobile device 50 in FIG. 40 and FIG. 42.

When the user is finished using the apparatus 10, they may transform the apparatus into its storage form 56 from its functional form 10, by performing the same operations that transformed the apparatus from its storage form 56 to it functional form 10 but in the reverse order and direction.

When the Applicant's apparatus is in its storage form 56, the user may place it in the storage compartment of a wallet or other case for holding credit cards. To allow the apparatus in storage form 56 to easily slip into a wallet, the edges of the apparatus in storage form 56 may be tapered all around. The apparatus in storage form should 56 be as thin as possible so that it may fit easily and comfortably inside a wallet.

The motion of the Support parts (16, 18) in relation to the Base parts (12, 14), as well as the motion of the two halves of the shown embodiment about axis X0, are controlled by hinge mechanisms. The hinge mechanisms are the result of the interaction of features that are included within the bodies of the constituent parts of the apparatus 10. An example of a hinge mechanism can be seen when components 34 and 36 (FIG. 2) are assembled together to form a hinge 24, as shown in FIG. 1, that the second Support 18 can rotate about in relation to the second Base 14.

Another embodiment of the hinge mechanism can be seen when components 38 (FIG. 8) and 40 (FIG. 14) come together to form hinge 26 (FIG. 1) that the two halves of the apparatus 56 can rotate about in one embodiment. The hinge 26 is a two-part hinge, composed of a pin and a barrel. As shown in FIG. 11, the barrel has an opening 13 along the axis of the hinge where the inner diameter 15 of the barrel is closest to the outer faces 17 of the profile of the cross section of the hinge.

The open-barrel design allows for the pin component of the hinge to have a dimension 11 as thick as the profile of the hinge, as shown in FIG. 11. This feature of this particular hinge design allows it to be used in situations where the profile of the application needs to remain very slim, and the pin needs to be as thick as possible within the available space for maximum mechanical strength.

A secondary benefit is that the open-barrel design allows for the barrel of the hinge to pry open in a flexible fashion. This is important in the case of the apparatus 10 since when the constituent parts are rotating about the hinge axes, the features that hold the parts in their intended locations, like component 41 shown in FIG. 18, pry open the hinge's barrel which acts like a flexible jaw. The flexible jaw, which is the barrel of this particular hinge, acts like a spring and holds components 41 (FIG. 18), against surface 29 (FIG. 7) which is tangent to circle 39 (FIG. 18) that is concentric with the axis of rotation of this hinge and has a diameter equal to the thickness of the profile of the mechanism. As a result of this interaction, the first Support 16 can be held at 90 degree orientations relative to the first Base 12, as shown in FIG. 30; or the first Support 16 can be held in the same plane as the first Base 12, as shown in FIG. 28. Component 41 (FIG. 18) enables these 90 degree position intervals by extending out from the center of rotation of the hinge, further than circle 39 (FIG. 18), to create perpendicular faces 47 and 49 (FIG. 18) which like surface 29 (FIG. 7) are tangent to circle 39 (FIG. 18). During the transformation of the apparatus between its storage and functional form, the Support parts (16, 18) rotate in relation to the Base parts (12, 14) about the axis of rotation of the aforementioned hinge. This rotation makes component 41 (FIG. 18) which is further out from the axis of rotation than the circle 39 (FIG. 18) to pass against surface 29 (FIG. 7). This extra material requires more space which in turn pries open the flexible jaws of the barrel of the hinge. The example of component 41 (FIG. 18) shows an advantage of having a flexible open barrel hinge for the apparatus 10.

Another benefit of the application of the open barrel hinge is that it acts as a fail-safe mechanism in situations that excessive unwanted loads are applied to the constituent parts of the apparatus 10. Using a conventional closed-barrel hinge would be disadvantageous in this application since not only does it result in a pin that is not at its maximum possible diameter, but it also prevents the pin to pop out of the barrel under excessive unwanted loads, causing either the pin to break, or the barrel to crack. However, with Applicant's open barrel design, under excessive loads, the barrel's gap 13 (FIG. 11) can pry open as much as the diameter of the pin to allow it to pop out without either the pin or the barrel breaking.

Figure 50:
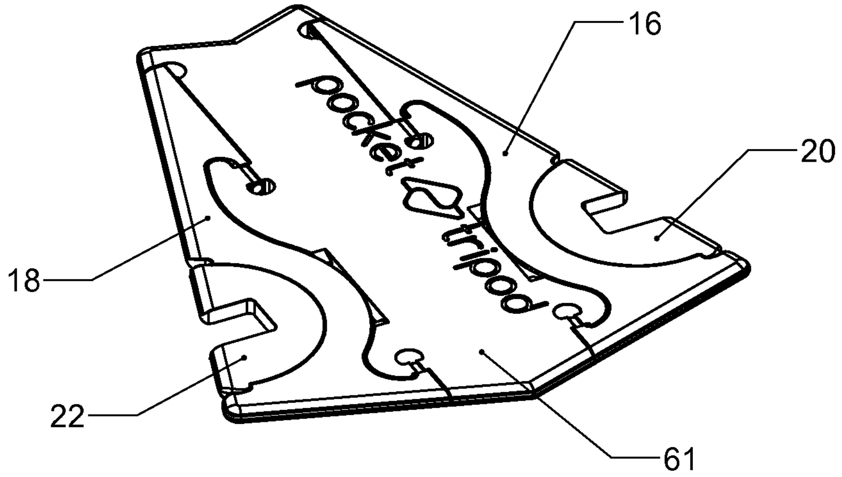
FIG. 50 is a schematic isometric view of one embodiment of Applicant's apparatus in its storage form, indicating the use of a one-piece base.
Figure 51:
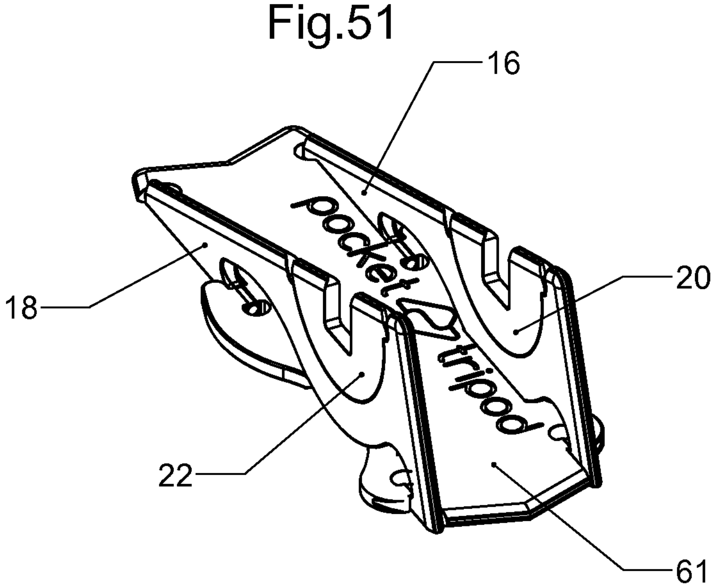
FIG. 51 is a schematic isometric view of one embodiment of Applicant's apparatus in its functional form, indicating the use of a one-piece base.

The embodiments of the apparatus 10 shown in the drawings show only some of many possible embodiments of achieving the functionalities of Applicant's apparatus. Another embodiment may have the apparatus 10 transform into a storage form that is not the size of a credit card, but instead smaller for holding objects or devices that are smaller and lighter and don't require as much support. Such embodiments may not require conservative stoppers that limit the motion to 90 degrees as the particular embodiment of apparatus 10, and could have wider range of tilt angles. Alternatively, the apparatus 10 may be larger for devices like tablet computers, so that it can support the weight and dimensions of the device, and be stored away by becoming flat and attaching to the back of the tablet or be placed in a carrying pouch along with the device. In larger embodiments, especially ones that do not require a rectangular envelope for storage, the need for twisting the two halves of the Applicant's apparatus may become redundant and the apparatus can function with a one-piece base 61 (FIG. 50-51), or one that is made of a pair of Base parts that only separate for landscape viewing but do not necessarily twist in relation to one another.

Another embodiment may have the Swivel parts and the Support parts connect using a sliding rail that has notches 62 (FIG. 53) for preset angles or so that it can hold heavier devices. Another embodiment can have the Swivel parts and the Support parts engage with gears 60 (FIG. 49) in the place of circular sliding rails, where the Support parts would have internal gears that engage with the external gears of the Swivel. This would allow for easier production of the Applicant's apparatus, and this embodiment would be able to hold heavier devices without the risk of it slipping due to the device's weight. An even simpler embodiment can be one that has only one preset viewing angle without any pair of the Swivel parts that rotate along circular rails, one that has the cut-outs which hold the mobile device, built directly into the Support parts.

Another embodiment may use metallic pins for the hinges, and notches to hold the various parts in the predetermined angles. Another embodiment may use parts that separate from one another in one form, for example the storage form, and are reassembled by the user to take another form, for example the functional form, with no snapping involved, and even constructed using a completely different material, such as Magnesium. Another embodiment may use parts that that snap into position using magnets. Another embodiment may use parts that are made of a durable paper, or a polymer like Polyvinyl Chloride or Polystyrene for example, and that are assembled by the user from one form to another. Another embodiment can be one that instead of using the aforementioned hinge mechanism described above, has the Support parts and the Base parts permanently attached by a thin flexible material 59 (FIG. 46, 48) also known as a living hinge. Another embodiment may have a mechanism built-in the Swivel parts that would allow for variable device thickness and shapes. For example, it may have a rubber lining around the contour of the cut-out, or it can be a more complex mechanism that uses adjustable jaws instead of cut-outs that can be manipulated to match the shape of the intended device 50 or other object that would be held by the apparatus 10.

Applicant's apparatus includes many other embodiments and variations thereof which are not illustrated in the drawings or discussed in the Detailed Description section. Those embodiments and variations, however, do fall within the scope of the appended claims and equivalents thereof.

Persons skilled in the art will recognize that the embodiments and variations illustrated in the drawings and discussed in the Detailed Description section do not disclose all of the possible arrangements of Applicant's apparatus, and that other arrangements are possible. Accordingly, all such other arrangements are contemplated by Applicant's apparatus, and are within the scope of the appended claims and equivalents thereof.

Persons skilled in the art also will recognize that many other embodiments incorporating Applicant's inventive concepts are possible, as well as many variations of the embodiments illustrated and described herein.

Although Applicant's apparatus are discussed herein in connection with a mobile electronic devices, persons skilled in the art will recognize that Applicant's apparatus also may be used with other types of devices and objects.

Although illustrated and described herein with reference to certain specific embodiments, Applicant's apparatus and devices are nevertheless not intended to be limited to the details shown. Rather, various modifications may be made in the details within the scope and range of equivalents of the claims without departing from the spirit of the invention.

What is claimed is:

1. An apparatus to support a device, comprising:
- a first base;
- a first support;
- a first base-support hinge adapted to rotatably couple the first base and the first support along a first axis of rotation;
- a first swivel slidably connected to the first support and having a first cut-out adapted to receive a first portion of the device;
- a second base;
- a second support;
- a second base-support hinge adapted to rotatably couple the second base and the second support along a second axis of rotation; and
- a second swivel slidably connected to the second support and having a second cut-out adapted to receive a second portion of the device spaced apart from the first portion of the device and wherein the first swivel is connected to the first support by at least one first curvilinear rail and/or the second swivel is connected to the second support by at least one second curvilinear rail.

2. An apparatus as in claim 1, wherein the device supported in at least one functional form of the apparatus is supported in a range of positions that vary between 0° and 180° as the first and second swivels slidably move and rotate in a same direction about a third axis of rotation.

3. An apparatus as in claim 1, further comprising: at least one base-base coupling adapted to couple the first base and the second base.

4. An apparatus as in claim 3, wherein the at least one base-base coupling is a hinge adapted to rotatably couple the first base and the second base.

5. An apparatus as in claim 1, wherein the first base is adjacent the second base in at least one functional form of the apparatus.

6. An apparatus as in claim 1, wherein the first base is spaced apart from the second base in at least one functional form of the apparatus.

7. An apparatus as in claim 1, wherein at least some of the first and second bases, the first and second supports, and the first and second swivels are adapted to collapse into at least one storage form of the apparatus and wherein the first and second bases, the first and second supports, and the first and second swivels are located in one plane in a storage form.

8. An apparatus as in claim 7, wherein a perimeter of the storage form has a shape of a polygon.

9. An apparatus as in claim 8, wherein the shape is rectangular.

10. An apparatus as in claim 7, wherein a perimeter of the storage form has a curvilinear shape.

11. An apparatus as in claim 7, wherein the storage form has a shape of a credit card and that is stored and carried in a case for holding cards, such as a wallet.

12. An apparatus as in claim 1 wherein at least one of the first curvilinear rail and the second curvilinear rail is a rail having a shape that is at least partially circular.

13. An apparatus as in claim 1, wherein at least one of the first base-support hinge and the second base-support hinge is a hinge comprising a pin and an open barrel.

14. An apparatus as in claim 1, wherein at least one of the first base-support hinge and the second base-support hinge is a living hinge comprising a thin flexible strip.

15. An apparatus as in claim 1, wherein at least one of the first and second curvilinear rails includes at least one notch.

16. An apparatus as in claim 1, wherein the first swivel is connected to the first support by at least one gear and/or the second swivel is connected to the second support by at least one other gear.

17. An apparatus as in claim 1, wherein the device is chosen from a group including a cellular phone, an ebook reader, a portable gaming console, or other portable electronic devices.

18. An apparatus to support a device, comprising:
- a single base;
- a first support;
- a first base-support hinge adapted to rotatably couple the single base and the first support along a first axis of rotation;
- a first swivel slidably connected to the first support and having a first cut-out adapted to receive a first portion of the device;
- a second support;
- a second base-support hinge adapted to rotatably couple the single base and the second support along a second axis of rotation; and a second swivel slidably connected to the second support and having a second cut-out adapted to receive a second portion of the device spaced apart from the first portion of the device wherein the first swivel is connected to the first support by at least one first curvilinear rail and/or the second swivel is connected to the second support by at least one second curvilinear rail.

* * * * *